(12) United States Patent
Beutel et al.

(10) Patent No.: US 12,320,698 B2
(45) Date of Patent: Jun. 3, 2025

(54) INTERCEPTION-PROOF SINGLE-PHOTON DETECTOR DEVICE FOR DETECTING AN OPTICAL SIGNAL

(71) Applicant: PIXEL PHOTONICS GMBH, Münster (DE)

(72) Inventors: Fabian Beutel, Münster (DE);
Wolfram Pernice, Münster (DE);
Nicolai Walter, Münster (DE)

(73) Assignee: PIXEL PHOTONICS GMBH, Münster (DE)

( * ) Notice: Subject to any disclaimer, the term of this patent is extended or adjusted under 35 U.S.C. 154(b) by 0 days.

(21) Appl. No.: 18/293,999

(22) PCT Filed: Jul. 28, 2022

(86) PCT No.: PCT/EP2022/071279
§ 371 (c)(1),
(2) Date: Jan. 31, 2024

(87) PCT Pub. No.: WO2023/012040
PCT Pub. Date: Feb. 9, 2023

(65) Prior Publication Data
US 2024/0337529 A1  Oct. 10, 2024

(30) Foreign Application Priority Data
Aug. 2, 2021  (DE) .................. 10 2021 119 983.2

(51) Int. Cl.
*G01J 1/44*  (2006.01)
*H04L 9/08*  (2006.01)

(52) U.S. Cl.
CPC ........... *G01J 1/44* (2013.01); *G01J 2001/442* (2013.01); *H04L 9/0852* (2013.01)

(58) Field of Classification Search
CPC .......... G01J 1/44; G01J 2001/442; G01J 1/42; H04L 9/0852; H04B 10/70
See application file for complete search history.

(56) References Cited

U.S. PATENT DOCUMENTS

| 11,994,426 B1 * | 5/2024 | Najafi ................... G01J 1/4228 |
| 2011/0278539 A1 * | 11/2011 | Bangsaruntip .... H01L 29/66439 |
| | | 257/14 |

(Continued)

FOREIGN PATENT DOCUMENTS

| CN | 104091884 A * | 10/2014 | ............. G01N 21/41 |
| CN | 209419638 U * | 9/2019 | ................ G01J 1/42 |

(Continued)

OTHER PUBLICATIONS

Elezov, M. et al., "A countermeasure against bright-light attack on superconducting nanowire single-photon detector in quantum key distribution", Arxiv.Org, Cornell University Library, 201 Olin Library Cornell University Ithaca, NY 14853, Jul. 15, 2019.

*Primary Examiner* — Georgia Y Epps
*Assistant Examiner* — Don J Williams
(74) *Attorney, Agent, or Firm* — DUANE MORRIS, LLP; Gregory M. Lefkowitz; Joaquin Hernandez

(57) ABSTRACT

The invention relates to a single-photon detector device (10) for detecting an optical signal, comprising an optical waveguide (12) and at least two nanowires (16, 18). The optical waveguide (12) is designed to guide the optical signal along an optical axis (14), wherein the at least two nanowires (16, 18) are arranged along the optical axis (14) relative thereto such that at least a second nanowire (18) is arranged in front of a first nanowire (16) with respect to the optical axis (14), wherein the at least two nanowires (16, 18) are designed to be superconductive at a specified temperature and, in the superconductive state, to generate an output signal when an intensity threshold of the optical signal is exceeded, and the (Continued)

at least two nanowires (16, 18) are designed so as to have different intensity thresholds. The invention additionally relates to the use of the aforementioned single-photon detector device for detecting an attack during a signal transmission encrypted using a quantum key distribution.

10 Claims, 1 Drawing Sheet

(56) References Cited

U.S. PATENT DOCUMENTS

| | | |
|---|---|---|
| 2018/0188107 A1 | 7/2018 | Zen |
| 2018/0335343 A1 | 11/2018 | Najafi |
| 2021/0381884 A1 | 12/2021 | Walter |
| 2022/0236108 A1 | 7/2022 | Perrenoud |

FOREIGN PATENT DOCUMENTS

| | | | | |
|---|---|---|---|---|
| CN | 111007036 A | * | 4/2020 | ............ G01N 21/41 |
| DE | 102019133066 | | 6/2021 | |
| EP | 3716252 | | 9/2020 | |
| JP | 2018004444 | | 1/2018 | |

* cited by examiner

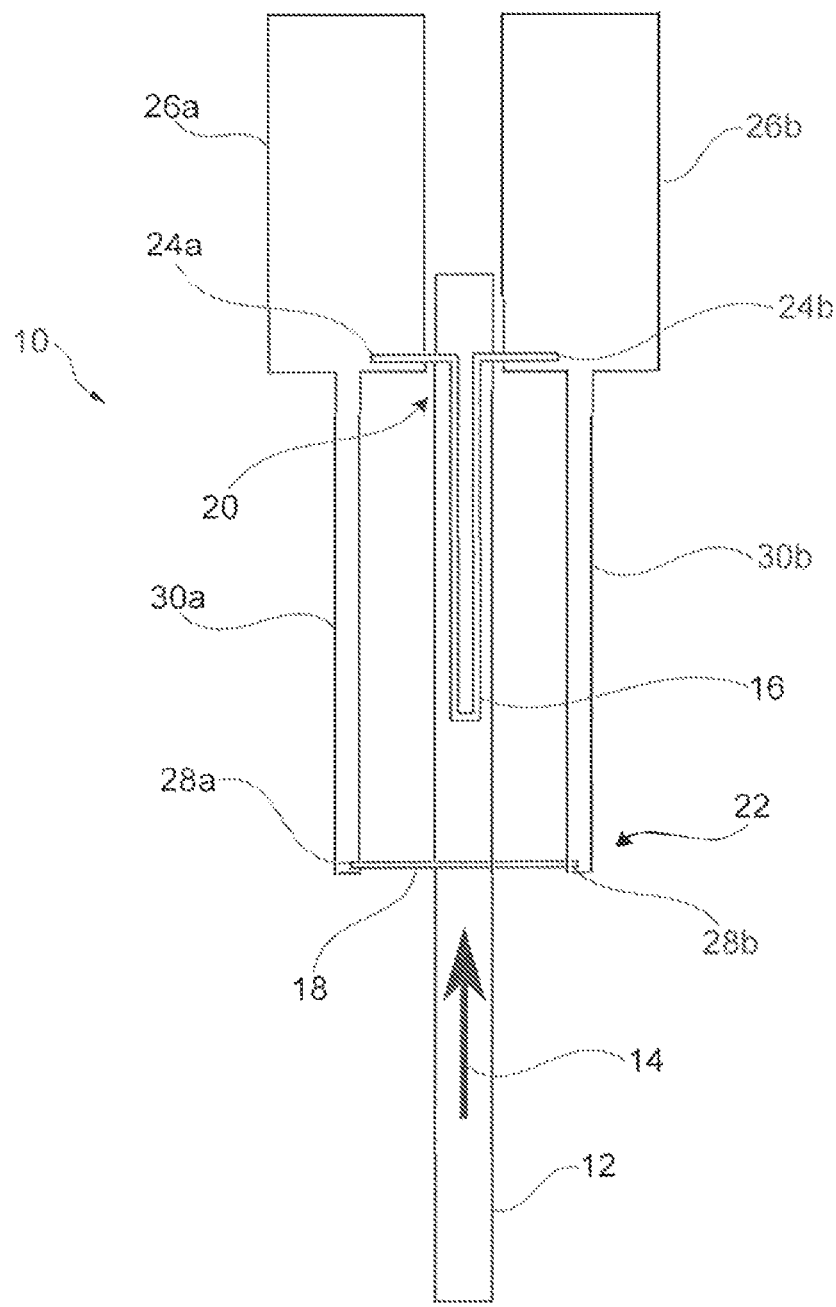

INTERCEPTION-PROOF SINGLE-PHOTON DETECTOR DEVICE FOR DETECTING AN OPTICAL SIGNAL

CROSS-REFERENCE TO RELATED APPLICATIONS

This application is a § 371 national stage entry of International Application No. PCT/EP2022/071279, filed on Jul. 28, 2022, which claims priority to German Patent Application No. 10 2021 119 983.2, filed on Aug. 2, 2021, the entire contents of which are incorporated herein by reference.

The invention relates to a single-photon detector device for detecting an optical signal, comprising an optical waveguide and at least two nanowires.

The invention furthermore relates to the use of the aforementioned device for recognizing an attack during a signal transmission encrypted using quantum key distribution.

With the emergence of quantum computers, conventional encryption methods are at risk because quantum computers can be used to carry out efficient attacks. By contrast, methods of quantum key distribution (QKD) themselves are secure when using quantum computers. In QKD, properties of quantum mechanics are used to provide two parties with a shared random number. This number is used in cryptography as a secret key in order to transmit signals, in a manner that is secured against eavesdropping, by means of symmetric encryption methods.

QKD enables verifiable secure communication based on physical principles because the security achieved is based on known physical laws rather than on assumptions regarding the performance of computers and algorithms or regarding the reliability of trusted persons. The security of QKD arises from an attacker who is eavesdropping on the key transmission being noticed.

The implementation of QKD in physical systems, however, requires that the physical components used—such as single-photon detectors—must also meet specific criteria. One essential prerequisite is that the physical components must function probabilistically and without influence by an external attacker.

Possible attacks on QKD in single-photon detectors are generally aimed at transferring the single-photon detector from the probabilistic operating region into an operating region controlled by the attacker. Such attacks are referred to as detector-blinding attacks. Due to these attacks, the detector no longer meets the prerequisite of a probabilistic behavior that is required for QKD, with the result that no verifiable security can be enabled anymore.

Approaches for recognizing detector-blinding attacks in single-photon detectors that have been known so far branch off a portion of the light that is incident on the detector and examine it for high light power, which could originate from an attacker. This requires additional components, such as beam splitters and detectors, which are decoupled from the actual detection setup. In this way, the complexity and the space requirement of the setup increases due to the additional components. In addition, the additional components mask new security gaps.

Proceeding from this, it is the object of the invention to provide a single-photon detector that can reliably recognize detector-blinding attacks and has reduced complexity.

This object is achieved by the features of the independent patent claims. The dependent claims relate to preferred developments.

So, according to the invention, a single-photon detector device for detecting an optical signal is provided, comprising an optical waveguide and at least two nanowires, wherein the optical waveguide is designed to guide the optical signal along an optical axis, wherein, with reference to the optical axis, the at least two nanowires are arranged along the optical axis, with the result that, with reference to the optical axis, at least one second nanowire is arranged before a first nanowire, wherein the at least two nanowires are designed to be superconducting at a predetermined temperature and are configured, in the superconducting state, to generate an output signal when a threshold value intensity of the optical signal is exceeded, and wherein the at least two nanowires are designed such that they have threshold value intensities that differ from one another.

The object is additionally achieved by the use of the aforementioned single-photon detector device for recognizing an attack during a signal transmission encrypted with quantum key distribution.

The core of the invention is the use of at least two nanowires at the same optical waveguide which have threshold value intensities that differ from one another and starting from which the output signal is generable. In the single-photon detector device, in other words, at least two superconducting nanowire single-photon detectors (SNSPDs) are used at the same optical waveguide. SNSPDs have as the actual detection element the nanowire which is superconducting at sufficiently low temperatures. SNSPDs permit that the output signal is generated only when a predetermined threshold value of the intensity of the optical signal—the threshold value intensity—is exceeded.

Since the at least two nanowires are arranged along the optical axis of the optical waveguide, the optical signal guided in the optical waveguide passes successively through the respective nanowires. Since the nanowires have threshold value intensities that differ from one another, the respective nanowires thus generate their respective output signals in the case of different intensities of the optical signal guided in the optical waveguide. Due to statistical evaluation of the output signals of the nanowires, it is thus possible to draw conclusions relating to the intensity of the incident optical signal. It is possible in this way to reliably recognize detector-blinding attacks on the single-photon detector.

The single-photon detector device thus has a reduced complexity compared with known devices in which additional components such as beam splitters and detectors are used in order to draw conclusions relating to the intensity of the optical signal. Accordingly, the security is increased because the second nanowire is located at the same waveguide as the first nanowire and no additional photonic components are used which themselves can have strong wavelength-dependent characteristics which an attacker could exploit. In addition, the space requirement is very low because the nanowires are very small. Due to the small space requirement, the production of the single-photon detector device is also cheap. In addition, due to the low complexity, the single-photon detector device can be scaled up easily. The single-photon detector device thus does not have any further detectors and/or optical components, but is capable of recognizing detector-blinding attacks on the single-photon detector device due to the at least two nanowires. In other words, this is a single-photon detector device protected against eavesdropping which can be used in QKD.

It is possible in principle for the single-photon detector device to have a multiplicity of nanowires which are each arranged along the optical axis of the optical waveguide. The nanowire which is reached last in this arrangement by the optical signal that is guided in the optical waveguide along the optical axis corresponds to the detector element of the SNSPD of the single-photon detector device that is used as the primary detector. This nanowire will also be referred to below as the first nanowire. The further nanowires—that is to say the second, third etc. nanowire—are thus arranged, with reference to the optical axis, before the first nanowire. Consequently, the optical signal guided in the optical waveguide first passes through the further nanowires before it reaches the first nanowire. With preference, the first nanowire is designed such that the output signal of the first nanowire is generable on the basis of very few photons, with particular preference on the basis of a single photon. Accordingly, the primary detector of the single-photon detector device is very sensitive and can detect even individual photons.

The further nanowires correspond to the detector elements of the SNSPDs used as secondary detectors, which ensure the recognition of attacks on the single-photon detector device. The single-photon detector device has at least one secondary detector, with the result that the single-photon detector device thus comprises, with the first nanowire, at least two nanowires. Consequently, the single-photon detector device is able to recognize optical signals on a single-photon level, as is required in QKD, and at the same time to recognize optical signals which in terms of their intensities deviate from the expected intensities and could originate from a detector-blinding attack.

The detection mechanism of an SNSPD is based on the following principle: The nanowire is supplied with an external direct current which, in terms of absolute value, is somewhat below the critical current, at which the superconductivity of the nanowire breaks down. One or more photons incident on the nanowire locally reduce, on account of the disintegration of Cooper pairs, the absolute value of the critical current to below the absolute value of the direct current applied. This results in the formation of a localized non-superconducting region or hotspot with finite electrical resistance. Owing to the finite electrical resistance, a measurable signal—that is to say the output signal—is generated in a readout amplifier.

The optical waveguide is preferably a planar optical waveguide structure used in the integrated optical unit. The first nanowire can in principle be applied to the optical waveguide. The first nanowire is preferably integrated in the waveguide. With particular preference, the first nanowire is integrated in the waveguide structure directly during the production of the waveguide, which is molded on a chip.

According to a preferred development of the invention, the second nanowire is designed such that the second nanowire has a higher threshold value intensity than the first nanowire. As has already been mentioned, the optical signal guided in the optical waveguide passes first through the second nanowire. Since the latter preferably has a high threshold value intensity, the second nanowire does not generate an output signal for optical signals having intensities below said threshold value. In other words, the secondary detector is not triggered at lower intensities of the optical signal. On the other hand, however, the output signal is generated by the second nanowire for optical signals having a high intensity. In this way, it is possible using the second nanowire to reliably recognize a detector-blinding attack on the single-photon detector device. If there are more than two nanowires, that is to say more than one secondary detector, all further nanowires preferably have a higher threshold value intensity than the first nanowire and additionally the threshold value intensities of the further nanowires differ from one another. It is thus possible due to statistical evaluation of the output signals of the nanowires to draw conclusions regarding the intensity of the incident optical signal.

The second nanowire is preferably arranged not only before the first nanowire with reference to the direction along which the optical signal is guided by the optical waveguide, but also in the spatial vicinity of the first nanowire. Preferably, the second nanowire with reference to the optical axis is located at a distance of no more than 100 nm from the first nanowire. The spatial vicinity has the advantage, in particular in connection with the production of the single-photon detector device in an integrated optical unit, that no inhomogeneities occur during the manufacture which would possibly result in different yields.

The threshold value intensity of the nanowire can be specified, among other things, via the absorption coefficient of the nanowire. In this context, provision is made according to a preferred development of the invention for the at least two nanowires to have absorption coefficients that differ from one another. With particular preference, provision is made for the second nanowire to be designed such that only a proportion of the optical signal guided in the optical waveguide is absorbed by the second nanowire. By contrast, the first nanowire is preferably designed such that the entire optical signal guided in the optical waveguide is absorbed by the first nanowire. Due to the different absorption coefficients, the second nanowire thus allows a large proportion of the optical signal to pass through, with the result that the optical signal can reach almost unchanged the first nanowire acting as the detector element of the primary detector.

With regard to the mutually differing absorption coefficients of the first and of the second nanowire, provision is made according to a preferred development of the invention for the second nanowire to be shorter than the first nanowire. The length of the nanowire influences the absorption coefficient of the nanowire, with the result that the absorption coefficient can be correspondingly specified via the length of the nanowire. The first nanowire preferably has a length that enables the complete absorption of the light guided in the optical waveguide. By contrast, the second nanowire is preferably shorter than the first nanowire. With particular preference, the length of the second nanowire is at most a fifth, with particular preference at most a tenth, of the length of the first nanowire. The short length of the second nanowire ensures that for low intensities of the optical signal, the second nanowire does not generate an output signal and accordingly only the first nanowire generates an output signal. In addition, the short length of the second nanowire also ensures that only a small proportion of the optical signal guided in the waveguide is absorbed. Furthermore, the second nanowire has, due to the short length, a very high detection rate and a short dead time. Accordingly, the second nanowire can recognize very short optical signals with a high repetition rate. This further simplifies the recognition of detector-blinding attacks.

It is not only the length of the nanowire that influences the absorption coefficient of the nanowire but also the orientation of the nanowire relative to the propagation direction of the optical signal guided in the optical waveguide. In principle, the nanowire can extend in any desired orientation relative to the propagation direction of the optical signal. For example, the nanowire can meander along the optical axis or perpendicularly in relation to the optical axis. In this connection, however, provision is made according to a preferred development of the invention for the first nanowire to extend along the optical axis of the waveguide. Due to the first nanowire extending along the optical axis, the absorption of the optical signal by the first nanowire is not dependent on the width of the first nanowire, but on the length thereof, which is many times greater than the width. Moreover, the absorption can be set via the length of the first nanowire. Provision is preferably made for the length of the first nanowire to be such that the entire optical signal guided in the optical waveguide is absorbed by the first nanowire.

Since the first nanowire acts as a detector element of the primary detector, the detection rate of the single-photon detector device decreases as the length of the first nanowire along the optical axis increases. By contrast, as the length of the first nanowire along the optical axis increases, the sensitivity of the single-photon detector device also increases. With regard to good balance, provision is made in a preferred development of the invention for the first nanowire to have a U-shape. That is to say that provision is preferably made for the first nanowire to comprise two areas which extend parallel to one another along the optical axis and for the two areas to be connected at their ends by a third area, so that the first nanowire has the shape of a U. This U-shape combines a high detection rate of the single-photon detector device with a high sensitivity and is additionally simple to produce. An additional advantage of the U-shape is that the ends of the first nanowire are substantially at the same point with reference to the optical axis. This simplifies the attachment of electrodes and thus the production of the single-photon detector device. As an alternative to the U-shape, a double U-shape or a W-shape is possible. In this case, the two ends of the "W" are likewise substantially at the same point with reference to the optical axis. In addition, the first nanowire in the case of the W shape has a greater length with the same extent along the optical axis compared with the U-shape. As a result, the absorption by the first nanowire also increases.

Regarding the orientation of the second nanowire, provision is made according to a further preferred development for the second nanowire to extend transversely to the optical axis of the waveguide. Owing to the second nanowire extending transversely to the optical axis, the absorption of the optical signal by the second nanowire is not dependent on the length of the second nanowire but on its width, which is many times smaller than the length. Accordingly, it is also the case that only a very small proportion of the optical signal is absorbed by the second nanowire, so that the optical signal can reach the first nanowire almost unchanged. In addition, this simplifies the connection of the ends of the second nanowire to electrodes and with particular preference to the electrodes of the first nanowire without increasing the length of the second nanowire.

In this context, provision is made according to a preferred development of the invention for the second nanowire to be formed in the shape of an I. With particular preference, the second nanowire does not have a meandering shape but extends in a straight line transversely to the optical axis of the waveguide, in the form of an I. This ensures that the second nanowire is as short as possible. A short length of the second nanowire is particularly advantageous due to the high detection rate and the low dead time in order to recognize detector-blinding attacks.

Regarding the length of the first and of the second nanowire, provision is preferably made for a length of the first nanowire to be between 1 µm and 500 µm, with particular preference between 20 µm and 500 µm, and/or for a length of the second nanowire to be between 100 nm and 50 µm, with particular preference between 100 nm and 10 µm. The lengths specified have proven to be particularly suitable for reliably recognizing detector-blinding attacks. The length corresponds to the extent of the nanowire from one end to the other end. Since the nanowires and in particular the first nanowire can have a meandering shape, a U-shape or any other desired shape, the length of the nanowire does not necessarily correspond to the extent of the nanowire along the optical axis.

According to a further preferred development of the invention, provision is additionally made for the at least two nanowires to be operable electrically in series, electrically in parallel or electrically independently from one another. As has already been mentioned, the principle of the SNSPDs used as primary and secondary detectors is based on the fact that the nanowire is supplied with an external direct current. Control of the at least two nanowires electrically independently from one another has the advantage that each nanowire can be supplied with an individual amount of the direct current. In this way, the intensity threshold value starting from which the output signal is produced by the nanowire can be individually influenced for each nanowire via the amount of the direct current. However, a disadvantage of the electrically independent control is that it involves an increased space requirement and in addition higher production costs. The electrically serial control and/or the electrically parallel control have the advantage that they can be implemented in a very space-saving manner and are additionally cheap. In addition, the control electrically in series and/or the control electrically in parallel requires no additional contacts and readout electronics, which means that the number of the electrical lines to the single-photon detector device is independent of the number of further nanowires.

With regard to the generation of the output signal, provision is made in a preferred development of the invention for the single-photon detector device to comprise at least two electrodes, wherein one end of the nanowire is in each case connected to an electrode. It is possible in principle for the single-photon detector device to comprise exactly two electrodes and for the ends of all nanowires to be connected to these two electrodes—that is to say in each case the first end of each nanowire is connected to the first electrode and the second end of each nanowire is connected to the second electrode. Accordingly, one electrode is thus used for a plurality of nanowires. Alternatively, provision can be made for each nanowire to be connected to two dedicated electrodes and for the single-photon detector device to consequently have more than two electrodes. In addition, mixed forms are possible in the case of a multiplicity of nanowires. The electrodes allow for an external direct current to be supplied to the nanowire. The electrodes are preferably made of a metallic material, for example chromium and/or gold. In principle, the electrodes can be located at any desired position of the optical waveguide, as long as they are in contact with the nanowire.

As has already been mentioned, the first nanowire is preferably a waveguide-integrated nanowire. In this context, provision is made according to a further preferred development of the invention for the second nanowire to be applied to the optical waveguide, to be arranged in the spatial vicinity of the optical waveguide, or to be integrated in the optical waveguide. The second nanowire can thus also be a waveguide-integrated nanowire. Accordingly, the single-photon detector device allows the recognition of detector-blinding attacks using only means of the integrated optical unit. Alternatively, the second nanowire can be applied to a top side of the waveguide or to a lower side of the waveguide. In addition, the second nanowire can also be applied on the side of the waveguide. It is likewise possible for the second nanowire to be arranged in the spatial vicinity of the optical waveguide, preferably in the optical near field of the waveguide, with particular preference no more than 1 μm away from the optical waveguide.

Provision is further preferably made for the nanowire to have a substantially rectangular cross section, wherein the thickness of the nanowire is such that a superconducting current can be guided through the nanowire. Preferably, the thickness of the nanowire is between 3 nm and 20 nm. With further preference, the width of the nanowire is between 10 nm and 500 nm. The thickness of the nanowire can be influenced during the production process by the thickness of the superconducting layer that is being deposited. The layer can be structured after the deposition for example by electron beam lithography and plasma-assisted etching methods, with the width of the nanowire being able to be determined in the process.

Regarding the material of the nanowire, provision is preferably made for the nanowires to comprise at least one of the materials from the group comprising Nb, NbN, NbTi, NbTiN, $Nb_3Ge$, $Nb_3Sn$, $SmFeAsO_{1-x}F_x$, CeOFeAs, $MgB_2$, $W_xSi_{1-x}$, MoRe, MoSi, TaN, graphene, iron-based high-temperature superconductors (iron pnictides), and high-temperature superconductors with copper oxide, in particular YBCO and/or BSCCO. The nanowire can consist of one of the materials or from several materials in any desired combination. Alternatively or additionally, it can also consist of further superconducting materials.

The invention will be explained by way of example below with reference to the drawing using preferred exemplary embodiments.

In the FIGURE,

FIG. 1 shows a schematic illustration of a single-photon detector device according to a preferred embodiment of the invention.

FIG. 1 shows a schematic illustration of a single-photon detector device 10 for detecting an optical signal. The single-photon detector device 10 comprises an optical waveguide 12. The waveguide 12 is designed to guide the optical signal along an optical axis 14. The single-photon detector device 10 furthermore comprises at least two nanowires 16, 18. The nanowires 16, 18 are designed to be superconducting at a sufficiently low temperature and are configured in the superconducting state to generate an output signal when a threshold value intensity of the optical signal is exceeded. The nanowires 16, 18 are the actual detector elements of superconducting nanowire single-photon detectors (SNSPDs), which are used on the waveguide 12 as a primary detector 20 and secondary detector 22.

The first nanowire 16 is part of the primary detector 20 of the single-photon detector device 10. To this end, the first nanowire 16 is connected by its ends 24a, 24b in each case to an electrode 26a, 26b, which in the present case are disposed to the right and left of the waveguide 12. The first nanowire 16 has a U-shape and extends along the optical axis 14 of the waveguide 12 such that its two ends 24a, 24b end at the same height.

The second nanowire 18 is part of the secondary detector 22 of the single-photon detector device 10. The second nanowire 18 is arranged, with reference to the optical axis 14 of the waveguide 12, before the first nanowire 16. The optical signal which is guided in the waveguide along the optical axis 14 thus first reaches the second nanowire 18 and then the first nanowire 16. The second nanowire 18 extends transversely to the optical axis 14 of the waveguide 12 and has a straight I-shape. The two ends 28a, 28b of the second nanowire 18 are likewise connected to the electrodes 26a, 26b. To this end, the two electrodes 26a, 26b each have extensions 30a, 30b.

In principle, it is possible for the single-photon detector device 10 to comprise more than one secondary detector 22 and thus for even further nanowires in addition to the second nanowire 18 to be present.

The nanowires 16, 18 of the primary detector 20 and secondary detector 22 are designed such that they have threshold value intensities that differ from one another. In the present case, the second nanowire 18 has a higher threshold value intensity, with the result that the output signal is generated by the secondary detector 22 only from a higher intensity of the optical signal. The higher threshold value intensity of the second nanowire 18 in the present case is realized by the second nanowire 18 being shorter than the first nanowire 16 and, in addition, being oriented transversely to the optical axis 14, in contrast to the first nanowire 16, which extends along the optical axis 14. The first nanowire 16 is preferably 180 μm long, and the second nanowire 18 in the present case is 5 μm long.

LIST OF REFERENCE SIGNS

10 Single-photon detector device
12 Waveguide
14 Optical axis
16 First nanowire
18 Second nanowire
20 Primary detector
22 Secondary detector
24 Ends of the first nanowire
26 Electrodes
28 Ends of the second nanowire
30 Extensions of the electrodes

We claim:

1. A single-photon detector device (10) for detecting an optical signal, comprising an optical waveguide (12) and at least two nanowires (16, 18), wherein the optical waveguide (12) is designed to guide the optical signal along an optical axis (14), wherein, with reference to the optical axis (14), the at least two nanowires (16, 18) are arranged along the optical axis (14), with the result that, with reference to the optical axis (14), at least one second nanowire (18) is arranged before a first nanowire (16), wherein the at least two nanowires (16, 18) are designed to be superconducting at a predetermined temperature and are configured in the superconducting state to generate an output signal when a threshold value intensity of the optical signal is exceeded, and wherein the at least two nanowires (16, 18) are designed to have threshold value intensities that differ from one another, wherein the second nanowire (18) is designed such that the second nanowire (18) has a higher threshold value intensity than the first nanowire (16).

2. The single-photon detector device (10) as claimed in claim 1, wherein the at least two nanowires (16, 18) have absorption coefficients that differ from one another.

3. The single-photon detector device (10) as claimed in claim 1, wherein the second nanowire (18) is shorter than the first nanowire (16).

4. The single-photon detector device (10) as claimed in claim 1, wherein the first nanowire (16) extends along the optical axis (14) of the waveguide (12).

5. The single-photon detector device (10) as claimed in claim 1, wherein the first nanowire (16) has a U-shape.

6. The single-photon detector device (10) as claimed in claim 1, wherein the second nanowire (18) extends transversely to the optical axis (14) of the waveguide (12).

7. The single-photon detector device (10) as claimed in claim 1, wherein the second nanowire (18) has an I-shape.

8. The single-photon detector device (10) as claimed in claim 1, wherein the at least two nanowires (16, 18) are operable electrically in series, electrically in parallel or electrically independently from one another.

9. The single-photon detector device (10) as claimed in claim 1, wherein the second nanowire (18) is applied to the optical waveguide (12), is arranged in the spatial vicinity of the optical waveguide (12), or is integrated in the waveguide (12).

10. The use of a single-photon detector device (10) as claimed in claim 1 for recognizing an attack in the case of a signal transmission encrypted with quantum key distribution.

\* \* \* \* \*